United States Patent
Sugiura

(10) Patent No.: US 9,035,216 B2
(45) Date of Patent: May 19, 2015

(54) METHOD AND DEVICE FOR CONTROLLING INTERIOR FRACTURES BY CONTROLLING THE LASER PULSE WIDTH

(75) Inventor: Ryuji Sugiura, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 780 days.

(21) Appl. No.: 13/262,995

(22) PCT Filed: Mar. 29, 2010

(86) PCT No.: PCT/JP2010/055585
§ 371 (c)(1),
(2), (4) Date: Nov. 15, 2011

(87) PCT Pub. No.: WO2010/116917
PCT Pub. Date: Oct. 14, 2010

(65) Prior Publication Data
US 2012/0103948 A1 May 3, 2012

(30) Foreign Application Priority Data

Apr. 7, 2009 (JP) .................................. 2009-092846

(51) Int. Cl.
*B23K 26/402* (2014.01)
*B23K 26/40* (2014.01)

(52) U.S. Cl.
CPC .................................. *B23K 26/4075* (2013.01)

(58) Field of Classification Search
CPC ............. B23K 26/4075; B23K 26/063; B23K 26/0635; B23K 26/0057; B23K 26/006
USPC ................ 438/462, 463; 219/121.72, 121.67, 219/121.61
See application file for complete search history.

(56) References Cited

U.S. PATENT DOCUMENTS

| 4,546,231 A | 10/1985 | Gresser et al. |
| 6,992,026 B2 | 1/2006 | Fukuyo et al. |

(Continued)

FOREIGN PATENT DOCUMENTS

| CN | 1160228 A | 9/1997 |
| CN | 1473087 | 2/2004 |

(Continued)

OTHER PUBLICATIONS

U.S. Appl. No. 13/206,181, filed Aug. 9, 2011.
(Continued)

*Primary Examiner* — Geoffrey S Evans
(74) *Attorney, Agent, or Firm* — Drinker Biddle & Reath LLP

(57) ABSTRACT

A laser processing device (100) comprises a laser light source (101) for emitting a laser light (L) and a laser light source controller (102) for controlling the pulse width of the laser light (L) and irradiates an object to be processed (1) with the laser light (L) while locating a converging point (P) within the object (1), so as to form a modified region along a line to cut (5) of the object (1) and generate a fracture extending in a thickness direction of the object (1) from the modified region as the modified region is formed. In the laser processing device (100), the laser light source controller (102) changes the pulse width of the laser light (L) according to a data table in which the fracture length, the thickness of the object (1), and the pulse width of the laser light (L) are associated with each other. That is, the pulse width is changed according to the fracture length generated from the modified region. Therefore, the laser processing device (100) can generate a fracture having a desirable length from the modified region.

12 Claims, 17 Drawing Sheets

(56) References Cited

U.S. PATENT DOCUMENTS

| | | | |
|---|---|---|---|
| 7,396,742 B2 | 7/2008 | Fukuyo et al. | |
| 7,489,454 B2 | 2/2009 | Fukuyo et al. | |
| 7,547,613 B2 | 6/2009 | Fukuyo et al. | |
| 7,566,635 B2 | 7/2009 | Fujii et al. | |
| 7,592,237 B2 | 9/2009 | Sakamoto et al. | |
| 7,592,238 B2 | 9/2009 | Fukuyo et al. | |
| 7,605,344 B2 | 10/2009 | Fukumitsu | |
| 7,608,214 B2 | 10/2009 | Kuno et al. | |
| 7,615,721 B2 | 11/2009 | Fukuyo et al. | |
| 7,626,137 B2 | 12/2009 | Fukuyo et al. | |
| 7,709,767 B2 | 5/2010 | Sakamoto | |
| 7,718,510 B2 | 5/2010 | Sakamoto et al. | |
| 7,719,017 B2 | 5/2010 | Tanaka | |
| 7,732,730 B2 | 6/2010 | Fukuyo et al. | |
| 7,749,867 B2 | 7/2010 | Fukuyo et al. | |
| 7,754,583 B2 | 7/2010 | Sakamoto | |
| 7,825,350 B2 | 11/2010 | Fukuyo et al. | |
| 7,897,487 B2 | 3/2011 | Sugiura et al. | |
| 7,902,636 B2 | 3/2011 | Sugiura et al. | |
| 7,939,430 B2 | 5/2011 | Sakamoto et al. | |
| 7,947,574 B2 | 5/2011 | Sakamoto et al. | |
| 2002/0195433 A1* | 12/2002 | Troitski | 219/121.69 |
| 2004/0002199 A1 | 1/2004 | Fukuyo et al. | |
| 2005/0199592 A1* | 9/2005 | Iri et al. | 219/121.6 |
| 2005/0202596 A1 | 9/2005 | Fukuyo et al. | |
| 2005/0272223 A1 | 12/2005 | Fujii et al. | |
| 2005/0274702 A1* | 12/2005 | Deshi | 219/121.72 |
| 2006/0011593 A1 | 1/2006 | Fukuyo et al. | |
| 2006/0065640 A1* | 3/2006 | Lizotte et al. | 219/121.61 |
| 2006/0144828 A1 | 7/2006 | Fukumitsu et al. | |
| 2006/0148212 A1 | 7/2006 | Fukuyo et al. | |
| 2006/0219673 A1* | 10/2006 | Varnham et al. | 219/121.6 |
| 2006/0255024 A1 | 11/2006 | Fukuyo et al. | |
| 2007/0085099 A1 | 4/2007 | Fukumitsu et al. | |
| 2007/0125757 A1 | 6/2007 | Fukuyo et al. | |
| 2007/0158314 A1 | 7/2007 | Fukumitsu et al. | |
| 2007/0228023 A1* | 10/2007 | Kleine et al. | 219/121.67 |
| 2007/0252154 A1 | 11/2007 | Uchiyama et al. | |
| 2008/0035611 A1 | 2/2008 | Kuno et al. | |
| 2008/0037003 A1 | 2/2008 | Atsumi et al. | |
| 2008/0090382 A1 | 4/2008 | Fujii et al. | |
| 2008/0218735 A1 | 9/2008 | Atsumi et al. | |
| 2008/0251506 A1 | 10/2008 | Atsumi et al. | |
| 2009/0008373 A1 | 1/2009 | Muramatsu et al. | |
| 2009/0032509 A1 | 2/2009 | Kuno et al. | |
| 2009/0098713 A1 | 4/2009 | Sakamoto | |
| 2009/0107967 A1 | 4/2009 | Sakamoto et al. | |
| 2009/0117712 A1 | 5/2009 | Sakamoto et al. | |
| 2009/0166342 A1 | 7/2009 | Kuno et al. | |
| 2009/0166808 A1 | 7/2009 | Sakamoto et al. | |
| 2009/0236324 A1* | 9/2009 | Fukuyo et al. | 219/121.72 |
| 2009/0250446 A1 | 10/2009 | Sakamoto | |
| 2009/0261083 A1 | 10/2009 | Osajima et al. | |
| 2009/0302428 A1 | 12/2009 | Sakamoto et al. | |
| 2010/0006548 A1 | 1/2010 | Atsumi et al. | |
| 2010/0009547 A1 | 1/2010 | Sakamoto | |
| 2010/0012632 A1 | 1/2010 | Sakamoto | |
| 2010/0012633 A1 | 1/2010 | Atsumi et al. | |
| 2010/0015783 A1 | 1/2010 | Fukuyo et al. | |
| 2010/0025386 A1 | 2/2010 | Kuno et al. | |
| 2010/0032418 A1 | 2/2010 | Kuno et al. | |
| 2010/0055876 A1 | 3/2010 | Fukuyo et al. | |
| 2010/0151202 A1 | 6/2010 | Fukumitsu | |
| 2010/0176100 A1 | 7/2010 | Fukuyo et al. | |
| 2010/0184271 A1 | 7/2010 | Sugiura et al. | |
| 2010/0200550 A1 | 8/2010 | Kumagai | |
| 2010/0203678 A1 | 8/2010 | Fukumitsu et al. | |
| 2010/0203707 A1 | 8/2010 | Fujii et al. | |
| 2010/0227453 A1 | 9/2010 | Sakamoto | |
| 2010/0240159 A1 | 9/2010 | Kumagai et al. | |
| 2010/0258539 A1 | 10/2010 | Sakamoto | |
| 2010/0301521 A1 | 12/2010 | Uchiyama | |
| 2010/0311313 A1 | 12/2010 | Uchiyama | |
| 2010/0327416 A1 | 12/2010 | Fukumitsu | |
| 2011/0000897 A1 | 1/2011 | Nakano et al. | |
| 2011/0001220 A1 | 1/2011 | Sugiura et al. | |
| 2011/0021004 A1 | 1/2011 | Fukuyo et al. | |
| 2011/0027971 A1 | 2/2011 | Fukuyo et al. | |
| 2011/0027972 A1 | 2/2011 | Fukuyo et al. | |
| 2011/0037149 A1 | 2/2011 | Fukuyo et al. | |
| 2011/0274128 A1 | 11/2011 | Fukumitsu et al. | |

FOREIGN PATENT DOCUMENTS

| | | |
|---|---|---|
| CN | 1640609 | 7/2005 |
| CN | 100471609 C | 3/2009 |
| JP | 2000-288758 | 10/2000 |
| JP | 2004-268103 | 9/2004 |
| JP | 2005-57257 | 3/2005 |
| JP | 3667705 | 7/2005 |
| JP | 2006-108459 | 4/2006 |
| JP | 2007-79161 | 3/2007 |
| JP | 2008-87053 | 4/2008 |
| JP | 2008-212998 | 9/2008 |
| JP | 2008-276057 | 11/2008 |
| JP | 2009-23215 | 2/2009 |
| WO | WO 2008/034036 | 3/2008 |

OTHER PUBLICATIONS

U.S. Appl. No. 13/269,274, filed Oct. 7, 2011.
U.S. Appl. No. 13/235,936, filed Sep. 19, 2011.
U.S. Appl. No. 13/213,175, filed Aug. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/131,429, filed Jun. 28, 2011.
U.S. Appl. No. 13/143,636, filed Sep. 21, 2011.
U.S. Appl. No. 13/148,097, filed Aug. 26, 2011.
U.S. Appl. No. 13/265,027, filed Oct. 18, 2011.
X. Liu et al., "Laser Ablation and Micromachining with Ultrashort Laser Pulses," IEEE Journal of Quantum Electronics, vol. 33, No. 10, Oct. 1997, pp. 1706-1716.

* cited by examiner

*Fig.10*

| | | Object thickness | | |
|---|---|---|---|---|
| | | 100 μm | 300 μm | 600 μm |
| Fracture length | 30 μm | 100nsec | 350nsec | 400nsec |
| | 40 μm | 150~200nsec | 350nsec | 400nsec |
| | 50 μm | 300nsec | 350nsec | 400nsec |
| | 60 μm | 350nsec | 350nsec | 400nsec |
| | 70 μm | 400nsec | 400nsec | 450nsec |
| | 80 μm | 450nsec | 400nsec | 450nsec |
| | 90 μm | 500nsec | 400nsec | 450nsec |
| | 100 μm | 550nsec | 400nsec | 450nsec |
| | 120 μm | — | 450nsec | 500nsec |
| | 140 μm | — | 450nsec | 500nsec |
| | 160 μm | — | 500nsec | 550nsec |
| | 180 μm | — | 500nsec | 550nsec |
| | 200 μm | — | 550nsec | 600nsec |
| | 220 μm | — | 550nsec | 600nsec |
| | 240 μm | — | 600nsec | 650nsec |
| | 260 μm | — | 600nsec | 650nsec |
| | 280 μm | — | 650nsec | 700nsec |
| | 300 μm | — | 650nsec | 700nsec |
| | 320 μm | — | 650nsec | 700nsec |

(a)

(b)

(c)

(a)

(b)

(a)

(b)

(a)

(b)

(c)

METHOD AND DEVICE FOR CONTROLLING INTERIOR FRACTURES BY CONTROLLING THE LASER PULSE WIDTH

TECHNICAL FIELD

The present invention relates to a laser processing device and laser processing method for cutting an object to be processed.

BACKGROUND ART

Known as a conventional laser processing device is one which irradiates a sheet-like object to be processed with a laser light while locating a converging point within the object, so as to form a modified region in the object along a line to cut of the object (see, for example, Patent Literature 1).

CITATION LIST

Patent Literature

Patent Literature 1: Japanese Patent Application Laid-Open No, 2006-108459

SUMMARY OF INVENTION

Technical Problem

In laser processing devices such as the one mentioned above, there is a case where a fracture extending along a thickness direction of the object to be processed (hereinafter simply referred to as "fracture") is generated from a modified region as the latter is formed. From the viewpoints of the cut surface state of the object after cutting, the processing speed, and the like, the laser processing devices in recent years have been demanded to generate a fracture having a desirable length from the modified region.

It is therefore an object of the present invention to provide a laser processing device and laser processing method which can generate a fracture having a desirable length from a modified region.

Solution to Problem

For achieving the above-mentioned object, the inventor conducted diligent studies and, as a result, has found that the fracture becomes longer when the pulse width of the laser light is made greater, thus acquiring the knowledge that there is a correlation between the pulse width of the laser light and the length of the fracture. This leads to an idea of generating a fracture having a desirable length from a modified region based on the above-mentioned correlation if possible, thereby completing the present invention.

Hence, the laser processing device in accordance with the present invention is a laser processing device for irradiating a sheet-like object to be processed with a laser light while locating a converging point within the object, so as to form a modified region in the object along a line to cut of the object and generate a fracture extending along a thickness direction of the object from the modified region as the modified region is formed, the laser processing device comprising a laser light source for emitting the laser light and control means for controlling a pulse width of the laser light, wherein the control means changes the pulse width according to a length of the fracture generated from the modified region.

This laser processing device changes the pulse width according to the length of the fracture generated from the modified region. Therefore, the above-mentioned correlation found between the pulse width and the length of the fracture can be utilized favorably, whereby a fracture having a desirable length can be generated from the modified region.

Here, the control means may change the pulse width such that the pulse width becomes greater as the length of the fracture generated increases.

Preferably, the control means changes the pulse width according to an input value concerning the length of the fracture. When a long fracture is desired to be generated from the modified region in this case, for example, the pulse width is made greater according to the input value concerning the length of this fracture.

Preferably, the control means changes the pulse width according to an input value concerning a thickness of the object to be processed. When the length of the fracture generated is grasped beforehand, for example, laser processing can be carried out in view of (on the basis of) the length of the fracture, whereby the pulse width can be changed according to the input value concerning the thickness of the object to be processed.

Preferably, the control means changes the pulse width according to an input value concerning a position of the converging point of the laser light. When the length of the fracture generated and the thickness of the object to be processed are grasped beforehand, for example, laser processing can be carried out in view of them, whereby the pulse width can be changed according to the input value concerning the converging point position of the laser light.

In a specific configuration for favorably achieving the operations and effects mentioned above, the laser light source is a fiber laser. In a specific configuration, the object to be processed is a silicon substrate, the laser light emitted from the laser light source has a wavelength of 1064 nm to 3000 nm, and the control means changes the pulse width within the range from 100 ns to 1500 ns.

The laser processing method in accordance with the present invention is a laser processing method comprising irradiating a sheet-like object to be processed with a laser light while locating a converging point within the object, so as to form a modified region in the object along a line to cut of the object, wherein the laser light has a substantially rectangular pulse waveform. This laser processing method can form the modified region accurately.

Advantageous Effects of Invention

The present invention can generate a fracture having a desirable length from a modified region.

BRIEF DESCRIPTION OF DRAWINGS

FIG. 10 is a chart illustrating an example of a data table;

DESCRIPTION OF EMBODIMENTS

Figure 1:
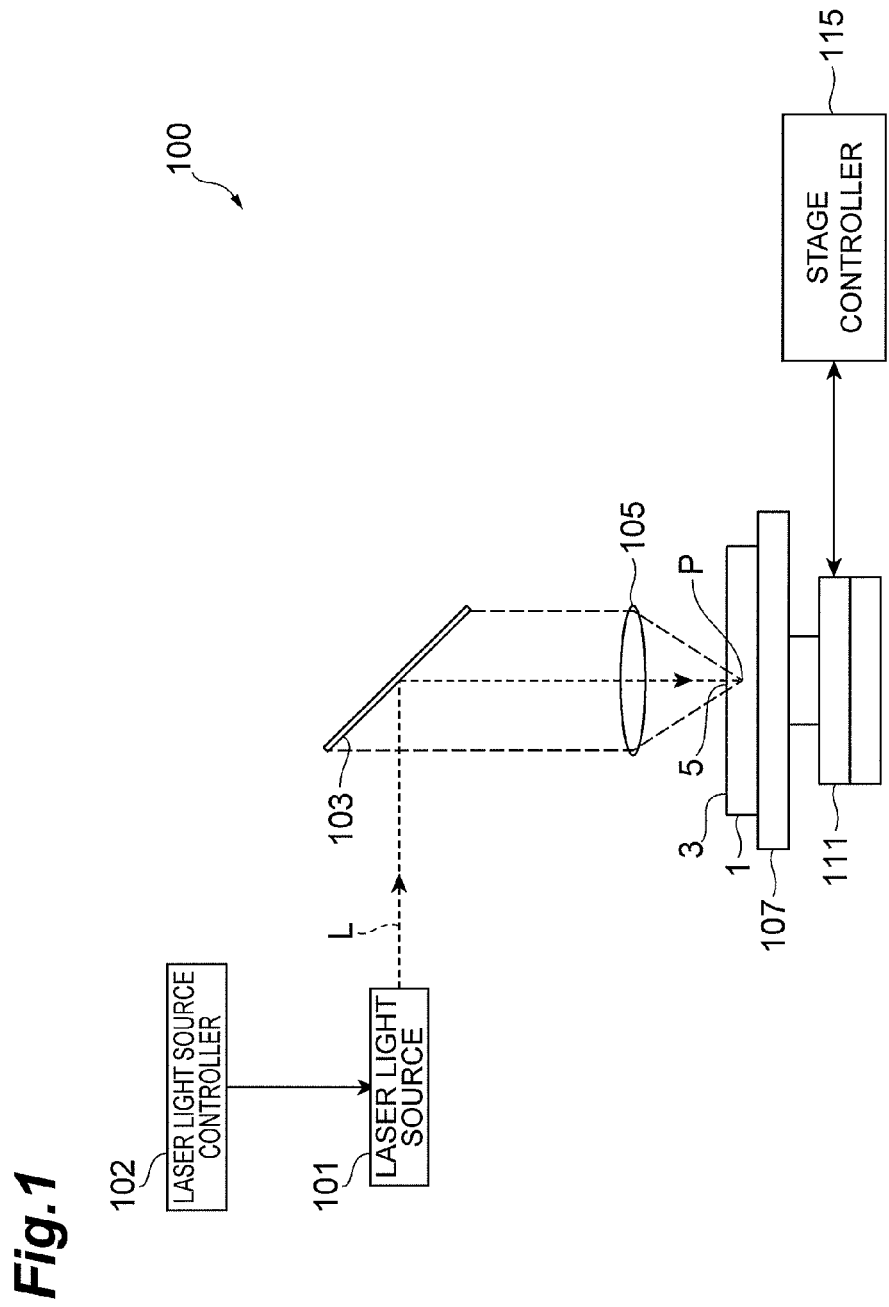
FIG. 1 is a schematic structural diagram of the laser processing device in accordance with an embodiment of the present invention.

In the following, preferred embodiments of the present invention will be explained in detail with reference to the drawings. In the drawings, the same or equivalent constituents will be referred to with the same signs while omitting their overlapping descriptions. Terms of upper, lower, left, and right are based on states illustrated in the drawings and used for convenience.

The laser processing device in accordance with an embodiment irradiates an object to be processed with a laser light while locating a converging point within the object, so as to form a modified region in the object. Therefore, the forming of the modified region by the laser processing device of this embodiment will firstly be explained with reference to FIGS. 1 to 6.

As illustrated in FIG. 1, a laser processing device 100 is a so-called SDE (Stealth Dicing Engine; registered trademark) comprising a laser light source 101 which causes a laser light L to oscillate in a pulsating manner, a dichroic mirror 103 arranged such as to change the direction of the optical axis (optical path) of the laser light L by 90°, and a condenser lens (condenser optical system) 105 for converging the laser light L. Employed here as the laser light source 101 is a fiber laser of polarization maintaining type, which emits the laser light L having a wavelength of 1064 nm to 3000 nm.

The laser processing device 100 also comprises a support table 107 for supporting an object to be processed 1 irradiated with the laser light L converged by the condenser lens 105, a stage 111 for moving the support table 107 along X, Y, and Z axes, a laser light source controller (control means) 102 for controlling the laser light source 101 in order to regulate the output, pulse width, and the like of the laser light L, and a stage controller 115 for controlling the movement of the stage 111.

In the laser processing device 100, the laser light L emitted from the laser light source 101 changes the direction of its optical axis by 90° with the dichroic mirror 103 and then is converged by the condenser lens 105 into the object 1 mounted on the support table 107. At the same time, the stage 111 is shifted, so that the object 1 moves relative to the laser light L along a line to cut 5. This forms a modified region along the line 5 in the object 1.

Figure 2:
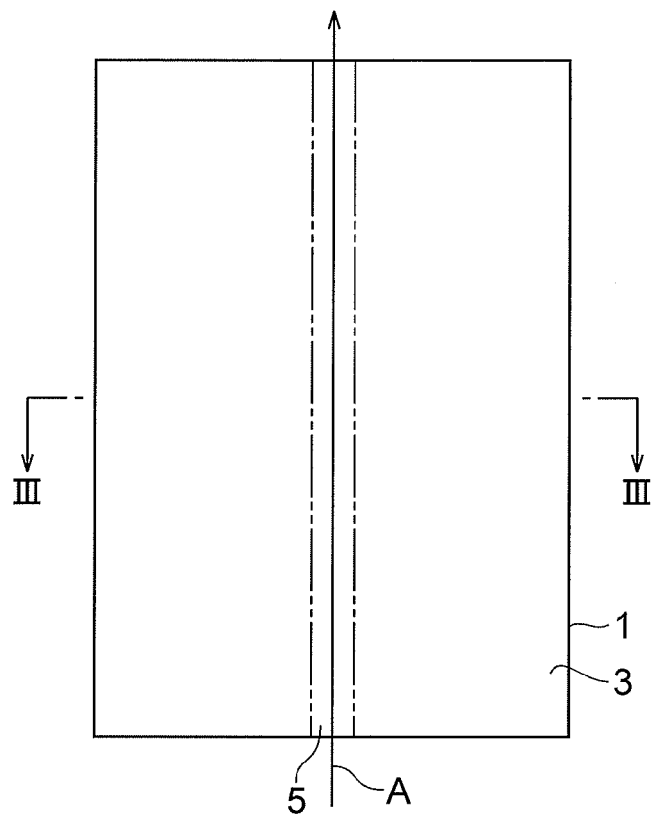
FIG. 2 is a plan view illustrating an example of an object to be processed in which a modified region is to be formed.
Figure 3:
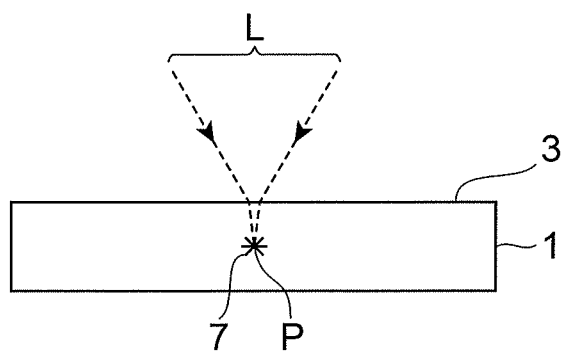
FIG. 3 is a sectional view of the object taken along the line III-III of FIG. 2.
Figure 4:
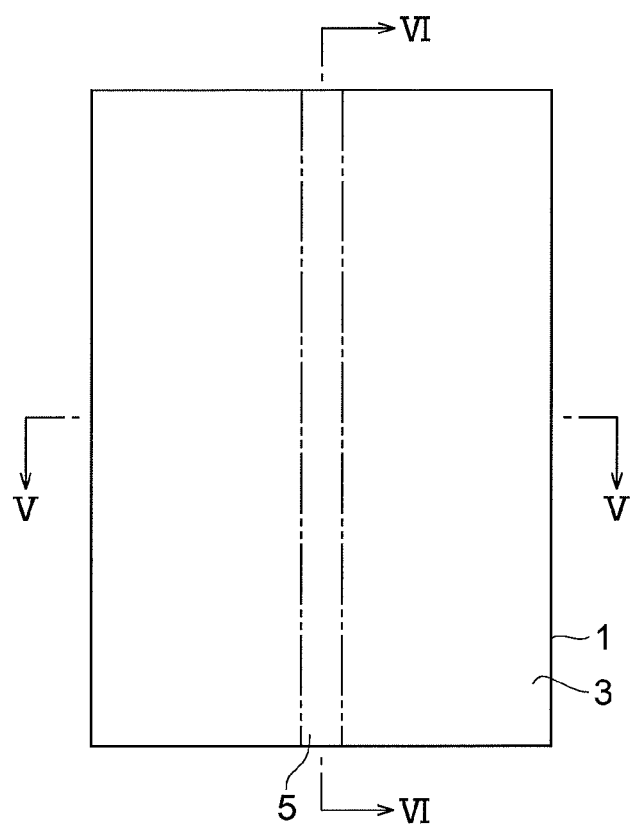
FIG. 4 is a plan view of the object after laser processing.
Figure 5:
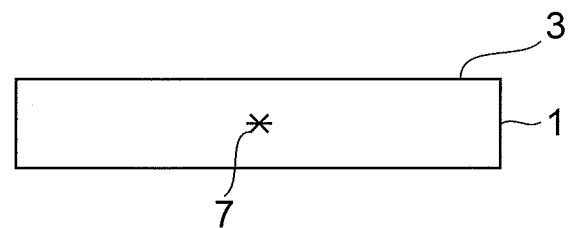
FIG. 5 is a sectional view of the object taken along the line V-V of FIG. 4.
Figure 6:
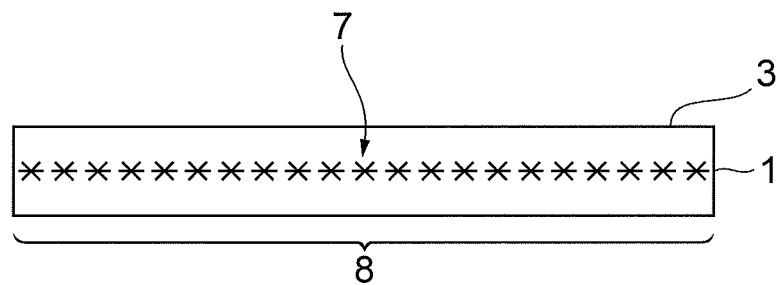
FIG. 6 is a sectional view of the object taken along the line VI-VI of FIG. 4.

As illustrated in FIG. 2, the object 1, for which a semiconductor material, a piezoelectric material, or the like is used, has the line 5 set therein for cutting the object 1. The line 5 is a virtual line extending straight. When forming a modified region within the object 1, the laser light L is relatively moved along the line 5 (i.e., in the direction of arrow A in FIG. 2) while locating a converging point P within the object 1 as illustrated in FIG. 3. This forms a modified region 7 within the object 1 along the line 5 as illustrated in FIGS. 4 to 6, whereby the modified region 7 formed along the line 5 becomes a cutting start region 8.

The converging point P is a position at which the laser light L is converged. The line 5 may be curved instead of being straight, and may be a line actually drawn on the front face 3 of the object 1 without being restricted to the virtual line. The modified region 7 may be formed either continuously or intermittently. The modified region 7 may be formed in rows or dots. In short, it will be sufficient if the modified region 7 is formed at least within the object 1.

Here, the laser light L is absorbed in particular in the vicinity of the converging point within the object 1 while being transmitted therethrough, whereby the modified region 7 is formed in the object 1 (i.e., internal absorption type laser processing). Therefore, the front face 3 of the object 1 hardly absorbs the laser light L and thus does not melt. In the case of forming a removing part such as a hole or groove by melting it away from the front face 3 (i.e., surface absorption type laser processing), the processing region gradually progresses from the front face 3 side to the rear face side in general.

The modified region formed by the laser processing device in accordance with this embodiment encompasses regions whose physical characteristics such as density, refractive index, and mechanical strength have attained states different from those of their surroundings. Examples of the modified region include molten processed regions, crack regions, dielectric breakdown regions, refractive index changed regions, and their mixed regions. Other examples of the modified region include an area where the density of the modified region has changed from that of an unmodified region in the material of the object and an area formed with a lattice defect (which will also be collectively referred to as a high-density transitional region).

The molten processed regions, refractive index changed regions, areas where the modified region has a density different from that of the unmodified region, or areas formed with a lattice defect may further incorporate a fracture (cut or microcrack) therewithin or at an interface between the modified and unmodified regions. The incorporated fracture may be formed over the whole surface of the modified region Or in only a part or a plurality of parts thereof.

Figure 7:
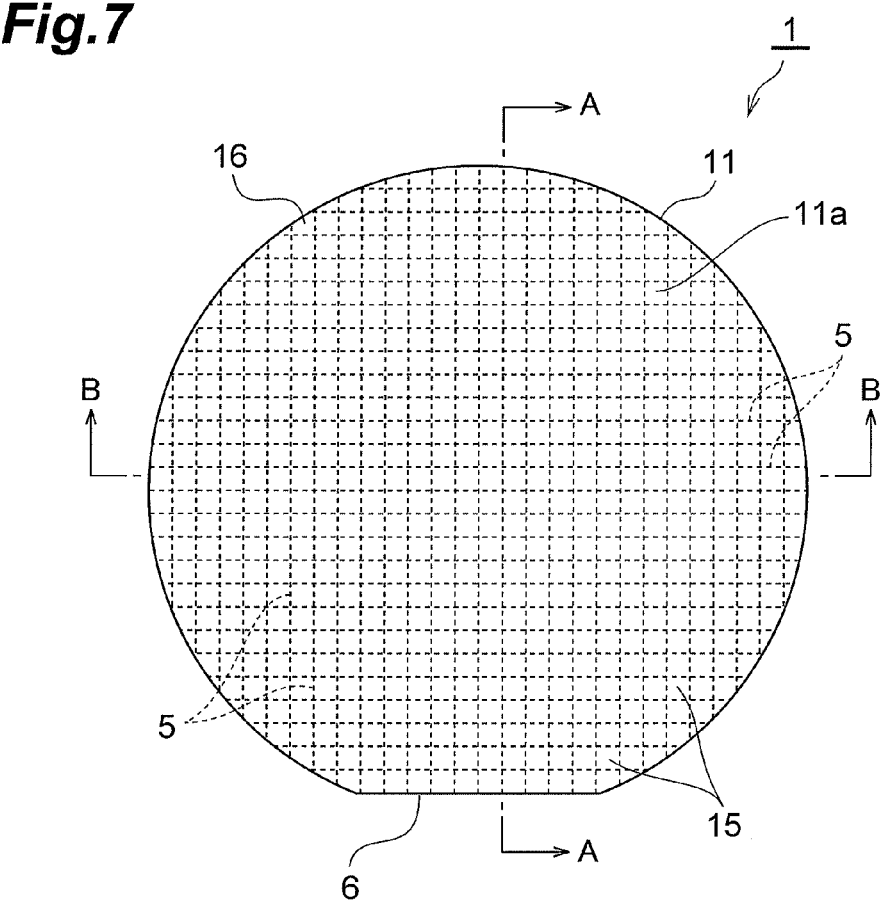
FIG. 7 is a plan view illustrating the object to be processed in accordance with the embodiment.

As illustrated in FIG. 7, the object 1 is a silicon substrate comprising a silicon wafer 1 and a functional device layer 16 formed on a front face 1a of the silicon wafer 1 while including a plurality of functional devices 15. A number of functional devices 15, examples of which include semiconductor operating layers formed by crystal growth, light-receiving devices such as photodiodes, light-emitting devices such as laser diodes, and circuit devices formed as circuits, are formed like a matrix in directions parallel and perpendicular to an orientation flat 6 of the silicon wafer 1.

When cutting the object 1 by using this laser processing device 100, the object 1 having an expandable tape attached to its rear face 21 is mounted on the support table 107. Subsequently, the object 1 is irradiated with the laser light L from the front face 3 side while locating the converging point P within the object 1 through the condenser lens 105, so as to form the modified region 7 to become a cutting start point within the object 1 along the lines 5 set like grids passing between adjacent functional devices 15. Then, the expandable tape is expanded, so as to cut the object 1 along the lines 5 accurately into the individual functional devices 15 from the modified region 7 acting as a cutting start point. As a result, a plurality of semiconductor chips each having a chip size of 1 mm×1 mm are obtained.

In the laser processing device 100 of this embodiment, in particular, the object 1 is irradiated with the laser light L while locating the converging point P within the object 1, so as to generate a fracture (also referred to as cut or crack) extending in the thickness direction of the object 1 from the modified region 7 as the latter is formed.

Figure 8:
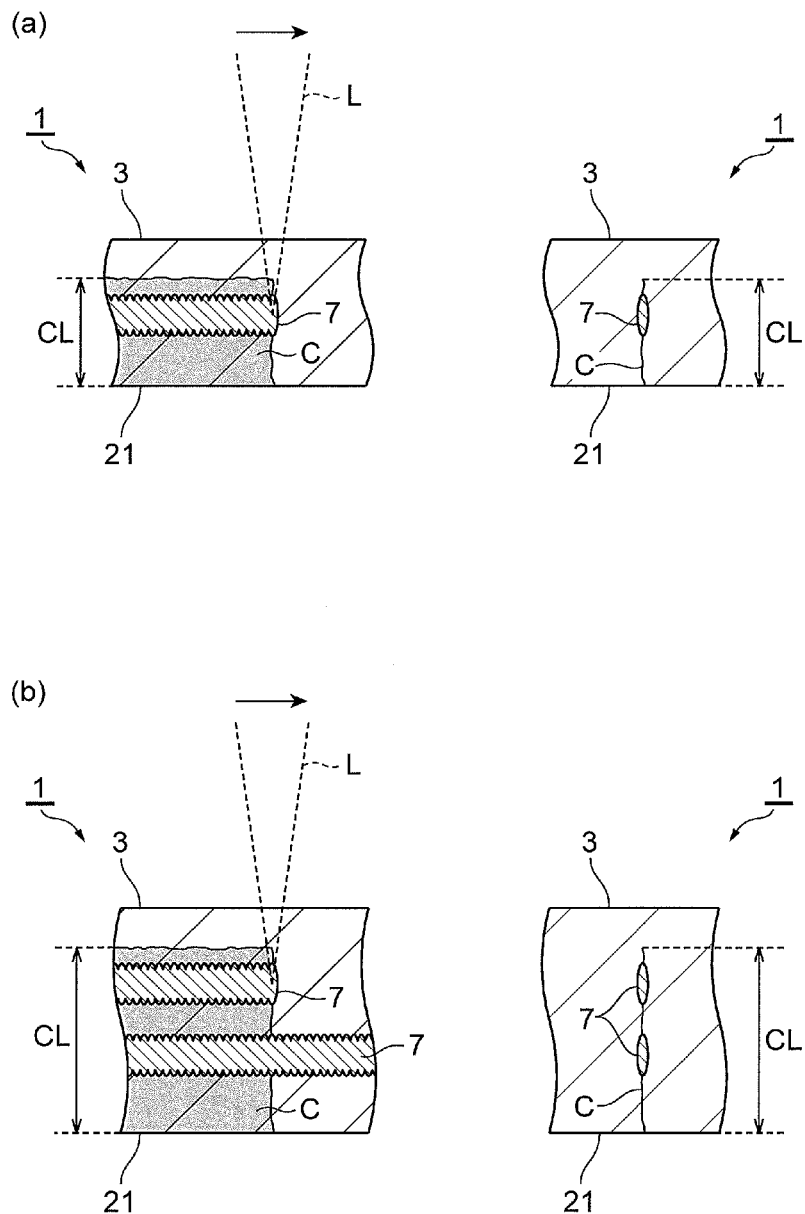
FIG. 8 is a sectional view for explaining a fracture generated from a modified region.

FIGS. 8(a) and (b) are sectional views for explaining fractures generated from the modified region. In FIG. 8, the drawings on the left side are sectional views corresponding to a cross section taken along the line A-A of FIG. 7, where the fracture C appears as a fracture mark (as in FIGS. 12 to 16 which will be explained later). The drawings on the right side are sectional views corresponding to a cross section taken along the line B-B of FIG. 7.

When forming one row of modified region 7 in the object 1 as illustrated in FIG. 8(a), the fracture C generated as the modified region 7 is formed means the one generated at the first scan (i.e., at the time of forming the first row of modified region 7). When forming a plurality of rows of modified regions 7 as illustrated in FIG. 8(b), on the other hand, it means the one generated at the last (final) scan of the laser light L. This is because the fracture mainly occurs at the final scan, since thermal influences, stresses, and the like accumulated upon irradiation with the laser light L are likely to be released at the final scan in general when forming a plurality of rows of the modified regions 7. The length CL of the fracture C (hereinafter referred to as "fracture length CL") indicates the distance from one end (upper end) of the fracture C to the other end (lower end) thereof.

The fracture C extends from the formed modified region 7 along the thickness direction of the object 1. In particular, the fracture C is likely to become a rear-side fracture and a front-side fracture, which extend toward the rear face 21 and the front face 3, when the modified region 7 is formed near the rear face 21 and the front face 3, respectively. In the depicted examples, the fractures C are those reaching the rear face 21 (so-called BHC). The fractures C herein are not modified and thus are not included in the modified region 7.

Figure 9:
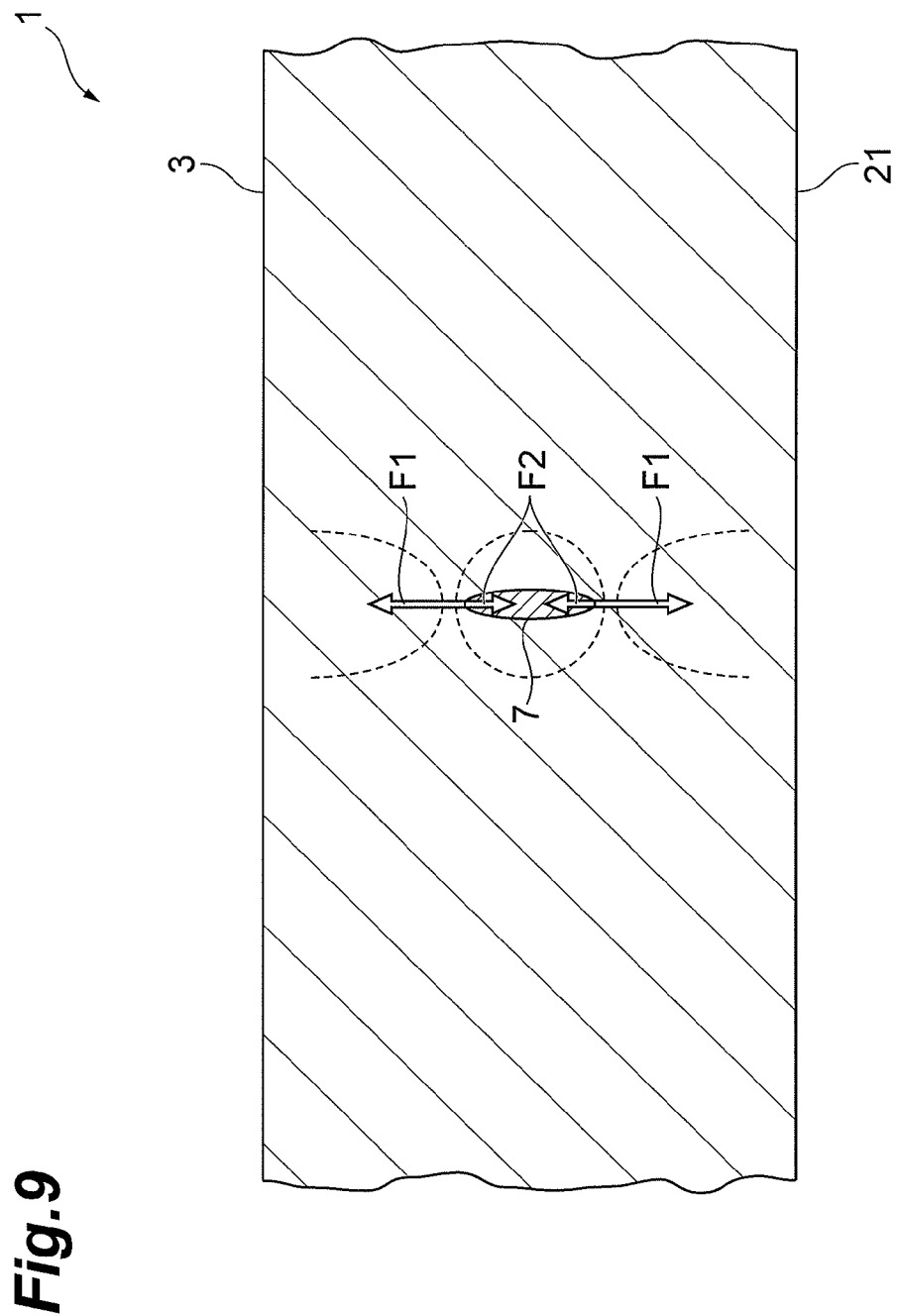
FIG. 9 is a sectional view of the object taken along the line B-B of FIG. 7.

Here, as illustrated in FIG. 9, the modified region 7 formed upon irradiation with the laser light L from the front face 3 (or rear face 21) of the object 1 has a form elongated in the thickness direction of the object 1. Compressive stresses F1 and tensile stresses F2 act on the upper and lower end portions of the modified region 7. Therefore, it is found that, when the pulse width of the laser light L is controlled at the time of forming the modified region 7, so as to adjust the size of the modified region 7, the actions of the stresses F1 and F2 can be regulated, whereby the length of the fracture C generated from the modified region 7 can be administered freely.

Hence, the laser light source controller 102 in this embodiment is adapted to change the pulse width of the laser light L according to the length of the fracture C generated from the modified region 7. That is, in order to generate the fracture C having a desirable length from the modified region 7, the laser light source controller 102 controls the pulse width such that the pulse width becomes greater as the fracture length CL generated increases (or the pulse width becomes smaller as the fracture length CL generated decreases).

Specifically, the laser light source controller 102 has a data table Tb (see FIG. 10) in which the fracture length CL, the thickness of the object 1, and the pulse width of the laser light L are associated with each other. The laser light source controller 102 changes the pulse width of the laser light L according to the data table Tb. The range within which the pulse width can be changed by the laser light source controller 102 here is 100 nsec to 1500 nsec as a condition for favorably achieving the laser processing.

FIG. 10 is a chart illustrating an example of the data table. As illustrated in FIG. 10, the values in the data table Tb represent pulse widths, which are configured so as to be selected and determined according to the fracture length CL and the thickness of the object 1 when they are set. In the chart, the columns of data where the thickness of the object 1 is 300 μm and 600 μm indicate data at the second scan.

Therefore, when the thickness of the object 1 and the fracture length L are fed into the laser light source controller 102 in this embodiment, these input values are checked against the data table Tb, whereby a pulse width suitable for the length of the fracture C to be generated according to the thickness of the object 1 is selected. Then, the laser light source 101 is controlled so as to emit the laser light L with this pulse width. That is, the pulse width is changed according to the input values of the thickness of the object 1 and the fracture length CL.

The position of the converging point P of the laser light L (i.e., the position where the modified region 7 is formed) in the object 1 may also be associated with the above-mentioned data table Tb as another parameter. In this case, the pulse width is also changed according to the input value of the position of the converging point P, while the position of the stage 111 (or the position of the condenser lens 105) is controlled by the stage controller 115 according to the data table Tb.

The stage controller 115 may separately have a data table Tb concerning the position of the converging point P of the laser light L. The position of the converging point P of the laser light L is an important parameter, since adjacent modified regions 7 may influence the fracture length CL (extension of the fracture C) when forming a plurality of rows of modified regions 7, for example.

As in the foregoing, in the laser processing device of this embodiment, the laser light source controller 102 changes the pulse width of the laser light L according to the data table Tb in which the fracture length CL, the thickness of the object 1, and the pulse width of the laser light L are associated with each other. That is, the pulse width is changed according to the fracture length CL generated from the modified region 7. Hence, the above-mentioned finding obtained concerning the pulse width and fracture length CL can be utilized favorably, whereby the fracture C having a desirable length can be generated from the modified region.

As a result, when the processing speed (takt time) is desired to be raised, for example, the fracture length CL can be increased by enhancing the pulse width in order to reduce the number of scans of the laser light L. When forming a plurality of rows of modified regions 7 in order to raise the processing quality, for example, on the other hand, the fracture length CL can be made shorter by reducing the pulse width.

Figure 11:
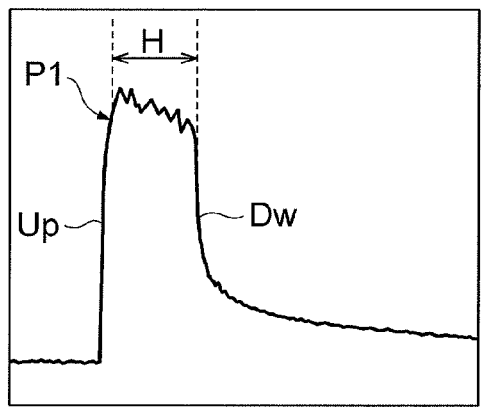
FIG. 11 is a chart illustrating pulse widths of laser lights.
Figure 11:
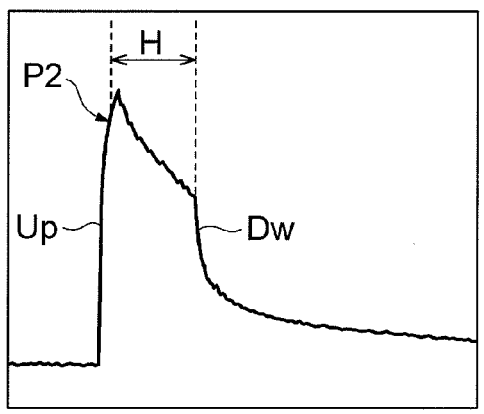
Figure 11:
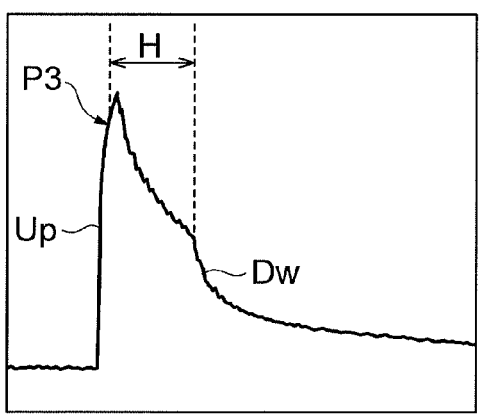

FIG. 11 is a chart illustrating pulse widths of laser lights. In the chart, the abscissa indicates time. As illustrated in FIG. 11 by the pulse width (half width) H is meant the time width from a rising edge Up of a waveform to a falling edge Dw thereof and varies depending on the current value applied to the laser light source 101, the repetition frequency thereof, and the like. That is, changing the pulse width H encompasses changing the current value, repetition frequency, and the like. In Gaussian distributions, the pulse width H is FWHM (Full Width at Half Maximum).

The pulse waveform P1 illustrated in FIG. 11(a) has a substantially rectangular form, while each of the pulse waveforms P2 and P3 illustrated in FIGS. 11(b) and (c) has a substantially saw-tooth form whose rising edge is acute. The laser light L having any of these pulse waveforms P1 to P3 can accurately form the modified region 7. Each of the pulse waveforms P1 to P3 has an acute (perpendicular) rising edge Up, which seems to contribute to forming the modified region accurately.

Figure 12:
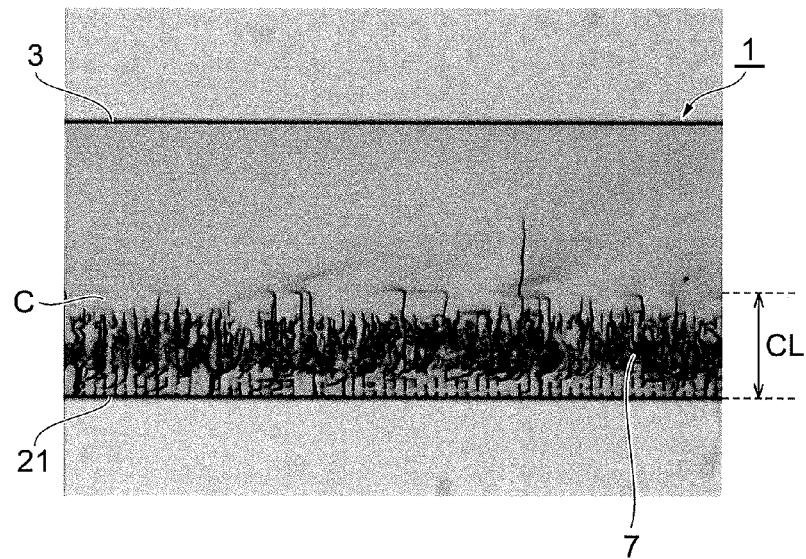
FIG. 12 is a sectional view illustrating an example of the object to be processed subjected to laser processing by the embodiment.
Figure 12:
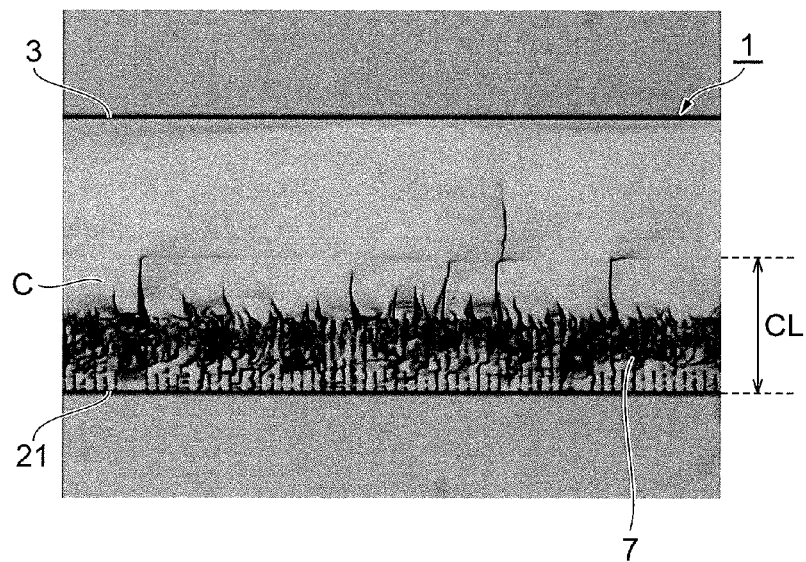
Figure 13:
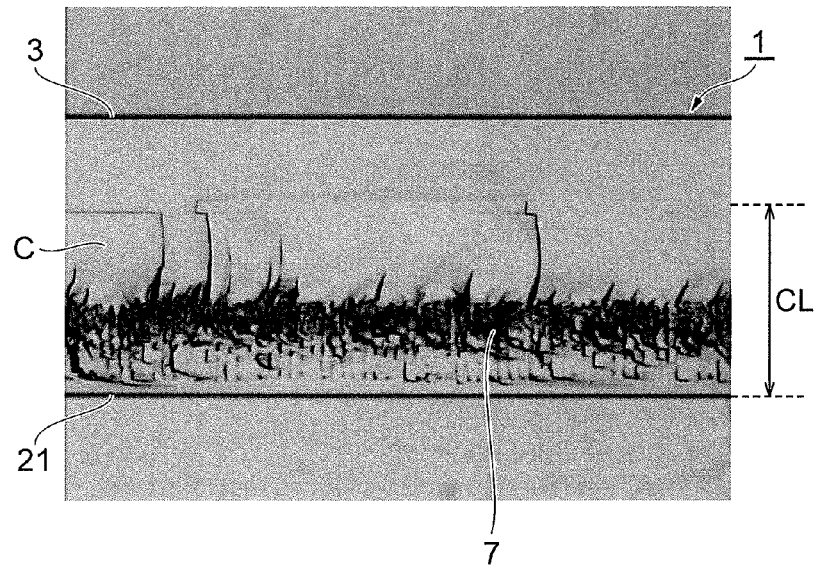
FIG. 13 is a sectional view illustrating an example different from FIG. 12.
Figure 13:
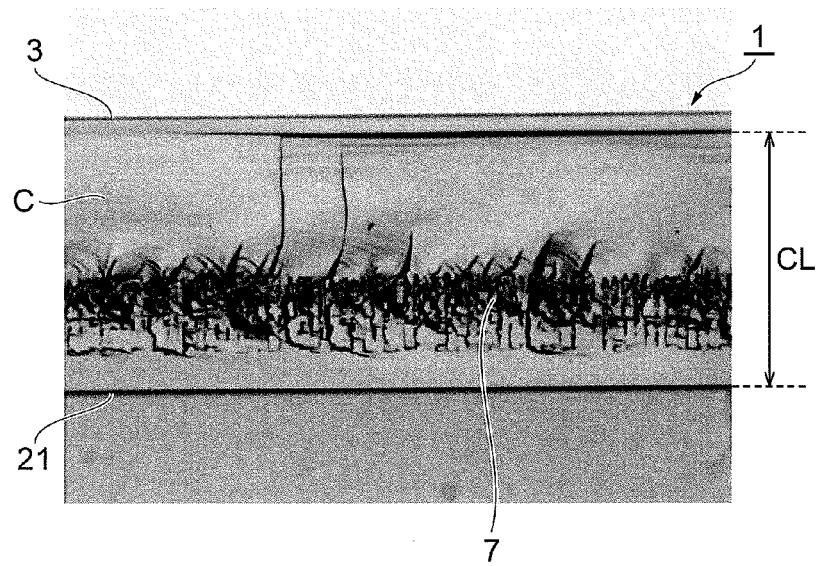
Figure 14:
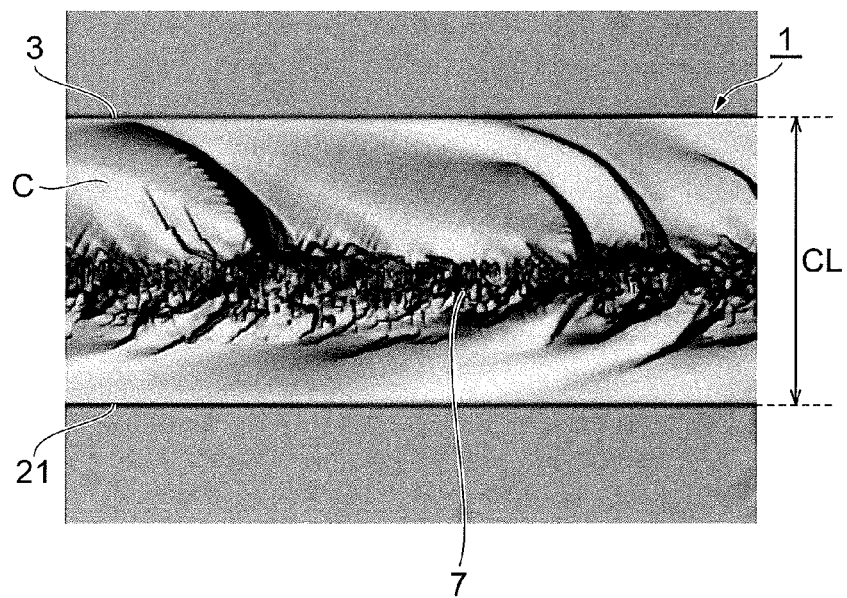
FIG. 14 is a sectional view illustrating an example different from FIG. 12.

FIGS. 12 to 14 are sectional views illustrating examples of the object subjected to laser processing by this embodiment. In each drawing, the object 1 having a thickness of 100 µm is irradiated with the laser light L from the front face 3 side, so as to form the modified region 7 and the fracture C.

In the example illustrated in FIG. 12(a), in order to generate the fracture C as BHC having the fracture length CL of 40 µm, the pulse width H is 150 nsec (E1 in FIG. 10), while the converging point P is located at 95 µm from the front face 3. In the example illustrated in FIG. 12(b), in order to generate the fracture C as BHC having the fracture length CL of 50 µm, the pulse width H is 300 nsec (E2 in FIG. 10), while the converging point P is located at 95 µm from the front face 3.

In the example illustrated in FIG. 13(a), in order to generate the fracture C as BHC having the fracture length CL of 70 µm, the pulse width H is 400 nsec (E3 in FIG. 10), while the converging point P is located at 85 µm from the front face 3. In the example illustrated in FIG. 13(b), in order to generate the fracture C as BHC having the fracture length CL of 90 µm, the pulse width H is 500 nsec (E4 in FIG. 10), while the converging point P is located at 80 µm from the front face 3. In the example illustrated in FIG. 14, in order to generate the fracture C as FC (full cut; the fracture C extending from the front face 3 to the rear face 21) having the fracture length CL of 100 µm, the pulse width H is 550 nsec (E5 in FIG. 10), while the converging point P is located at 60 µm from the front face 3.

Figure 15:
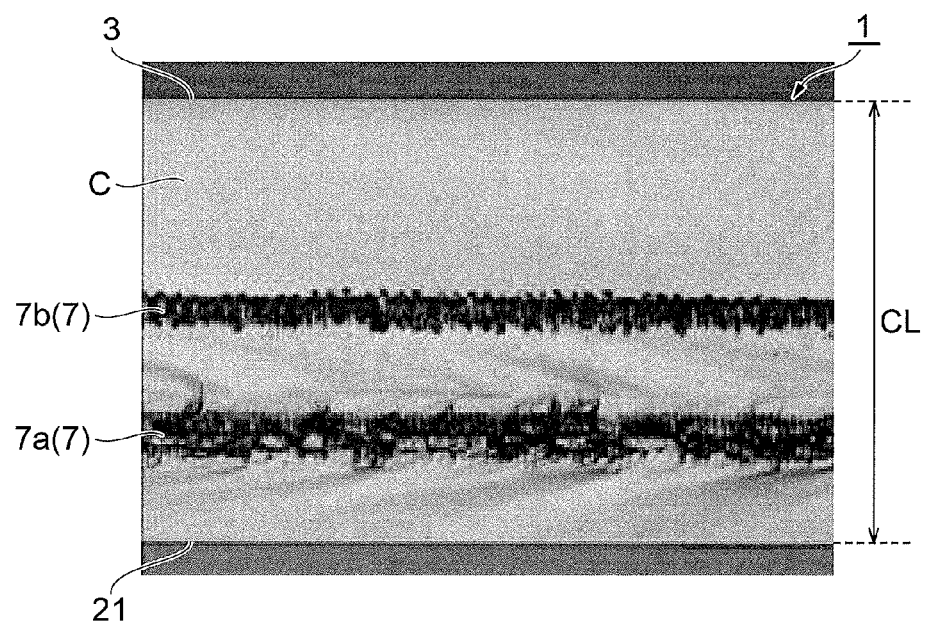
FIG. 15 is a sectional view illustrating another example of the object to be processed subjected to laser processing by the embodiment.

FIG. 15 is a sectional view illustrating another example of the object to be processed subjected to laser processing by this embodiment. In this drawing, the object to be processed 1 having a thickness of 300 µm is irradiated with the laser light L from the front face 3 side, so as to form modified regions 7a, 7b, while the fracture C is generated from the modified region 7b on the upper side. Specifically, in the example illustrated in FIG. 15, the converging point P is located at 240 µm from the front face 3, so as to form the modified region 7a, and then at 155 µm from the front face 3, so as to form the modified region 7b. When forming the modified region 7b, the pulse width H is 650 nsec (E6 in FIG. 10) in order to generate the fracture C as FC having the fracture length CL of 300 µm.

Figure 16:
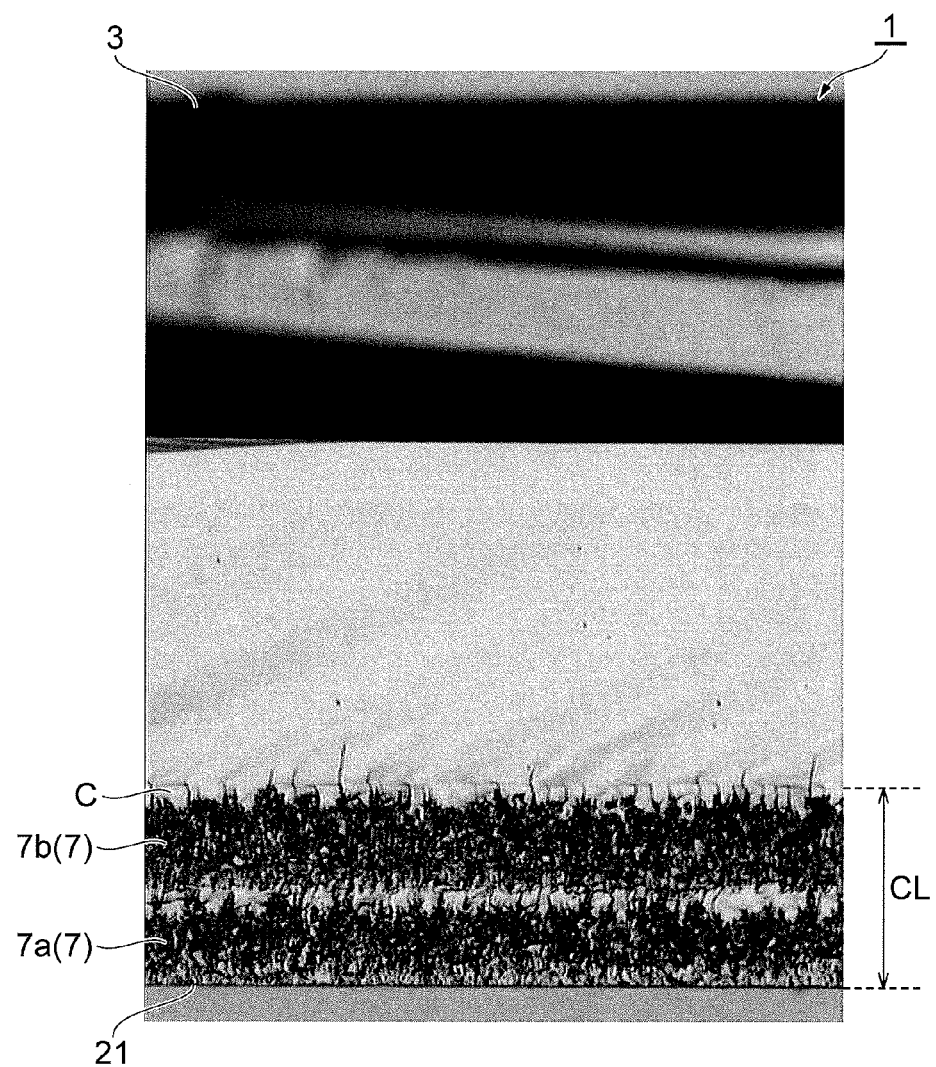
FIG. 16 is a sectional view illustrating still another example of the object to be processed subjected to laser processing by the embodiment.

FIG. 16 is a sectional view illustrating still another example of the object to be processed subjected to laser processing by the embodiment. In this drawing, the object to be processed 1 having a thickness of 600 µm is irradiated with the laser light L from the front face 3 side, so as to form modified regions 7a, 7b, while the fracture C is generated from the modified region 7b on the upper side. Specifically, in the example illustrated in FIG. 16, the converging point P is located at 591 µm from the front face 3, so as to form the modified region 7a, and then at 541 µm from the front face 3, so as to form the modified region 7b. When forming the modified region 7b, the pulse width H is 500 nsec (E7 in FIG. 10) in order to generate the fracture C as BHC having the fracture length CL of 140 µm.

The above-mentioned operation and effect that the fracture C having the desirable fracture length CL can be generated from the modified region 7 by changing the pulse width of the laser light L can be seen from the sectional views illustrated in FIGS. 12 to 16.

While a preferred embodiment of the present invention has been explained in the foregoing, the laser processing device in accordance with the present invention is not limited to the laser processing device 100 in accordance with the embodiment, but may be any of those modifying the same within a scope which does not change the gist set forth in each claim or those applying the same to others.

For example, while the fracture length CL, the thickness of the object 1, and the pulse width of the laser light L are associated with each other so as to construct the data table Tb (see FIG. 10) in the above-mentioned embodiment, this is not restrictive as long as the pulse width can be changed according to the fracture length CL generated (or to be generated) from the modified region 7.

Hence, when the thickness of the object 1 is grasped beforehand, the laser processing can be carried out in view of this thickness, whereby the fracture length CL and the pulse width of the laser light L may be associated with each other alone, so as to construct the data table Tb. That is, the pulse width can be changed according to the input value concerning the fracture length CL alone.

Figure 17:
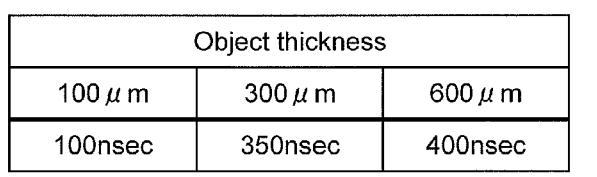
FIG. 17 is a chart illustrating other examples of the data table.
Figure 17:
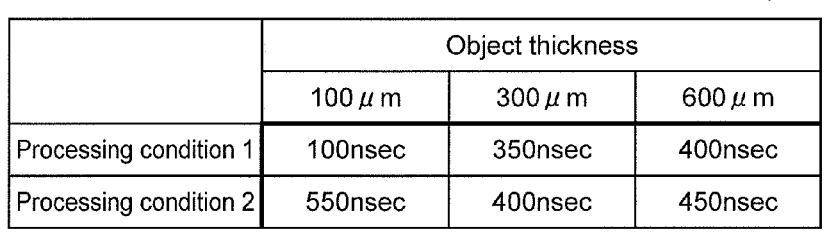
Figure 17:
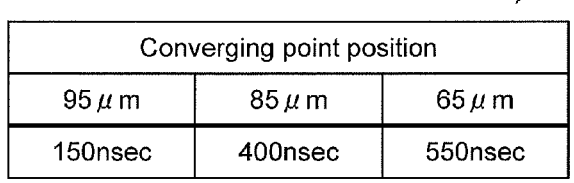

When the fracture length CL formed is grasped beforehand, on the other hand, the laser processing can be carried out in view of (based on) the fracture length CL, whereby the thickness of the object 1 and the pulse width of the laser light L may be associated with each other alone as illustrated in FIG. 17(a), so as to construct the data table Tb. That is, the pulse width can be changed according to the input value concerning the thickness of the object 1 alone. Here, as illustrated in FIG. 17(b), processing conditions including processing condition 1 which is a condition more concerned with the quality and processing condition 2 which is a condition more concerned with the processing speed may further be associated therewith, so as to construct the data table Tb. This can favorably respond to the making of a plurality of kinds of mass products.

When the fracture length CL and the thickness of the object 1 are grasped beforehand, the laser processing can be carried out in view of them, whereby the position of the converging point P and the pulse width of the laser light L may be associated with each other alone as illustrated in FIG. 17(c), so as to construct the data table Tb. That is, the pulse width can be changed according to the input value concerning the position of the converging point P alone.

The data table Tb is fed into the laser light source controller 102 beforehand in the above-mentioned embodiment but may be read by the laser light source controller 102 through a line such as the Internet.

When the laser light L is converged at a position deep from the laser entrance surface of the object 1 where the laser light L is incident, the laser light L can effectively be utilized at the converging point P if the object 1 increases its transmittance. The object 1 may contain or comprise silicon, glass, $LiTaO_3$, or sapphire ($Al_2O_3$), for example.

INDUSTRIAL APPLICABILITY

A fracture having a desirable length can be generated from a modified region.

REFERENCE SIGNS LIST

1 . . . object to be processed; 5 . . . line to cut; 7, 7a, 7b . . . modified region; 100 . . . laser processing device;

101 . . . laser light source; 102 . . . laser light source controller (control means); C . . . fracture; CL . . . fracture length (length of fracture); L . . . laser light; P . . . converging point

The invention claimed is:

1. A laser processing device for irradiating a sheet object to be processed with a laser light while locating a converging point within the object, so as to form a modified region in the object along a line to cut of the object and generate a fracture extending along a thickness direction of the object from the modified region as the modified region is formed the laser processing device comprising;
a laser light source for emitting the laser light; and
a controller for controlling a pulse width of the laser light;
wherein the controller changes the pulse width according to a length of the fracture generated from the modified region, wherein the controller changes the pulse width according to an input value concerning the length of the fracture.

2. A laser processing device according to claim 1, wherein the controller changes the pulse width such that the pulse width becomes greater as the length of the fracture generated increases.

3. A laser processing device according to claim 1, wherein the laser light source is a fiber laser.

4. A laser processing device according to claim 1, wherein the object is a silicon substrate;
wherein the laser light emitted from the laser light source has a wavelength of 1064 nm to 3000 nm; and
wherein the controller changes the pulse width within the range from 100 nsec to 1500 nsec.

5. A laser processing device for irradiating a sheet object to be processed with a laser light while locating a converging point within the object, so as to form a modified region in the object along a line to cut of the object and generate a fracture extending along a thickness direction of the object from the modified region as the modified region is formed, the laser processing device comprising:
a laser light source for emitting the laser light; and
a controller for controlling a pulse width of the laser light;
wherein the controller changes the pulse width according to a length of the fracture generated from the modified region, wherein the controller changes the pulse width according to an input value concerning a thickness of the object.

6. A laser processing device according to claim 5, wherein the controller changes the pulse width such that the pulse width becomes greater as the length of the fracture generated increases.

7. A laser processing device according to claim 5, wherein the laser light source is a fiber laser.

8. A laser processing device according to claim 5, wherein the object is a silicon substrate;
wherein the laser light emitted from the laser light source has a wavelength of 1064 nm to 3000 nm; and
wherein the controller changes the pulse width within the range from 100 nsec to 1500 nsec.

9. A laser processing device for irradiating a sheet object to be processed with a laser light while locating a converging point within the object, so as to form a modified region in the object along a line to cut of the object and generate a fracture extending along a thickness direction of the object from the modified region as the modified region is formed, the laser processing device comprising:
a laser light source for emitting the laser light; and
a controller for controlling a pulse width of the laser light;
wherein the controller changes the pulse width according to a length of the fracture generated from the modified region, wherein the controller changes the pulse width according to an input value concerning a position of the converging point of the laser light.

10. A laser processing device according to claim 9, wherein the controller changes the pulse width such that the pulse width becomes greater as the length of the fracture generated increases.

11. A laser processing device according to claim 9, wherein the laser light source is a fiber laser.

12. A laser processing device according to claim 9, wherein the object is a silicon substrate;
wherein the laser light emitted from the laser light source has a wavelength of 1064 nm to 3000 nm; and
wherein the controller changes the pulse width within the range from 100 nsec to 1500 nsec.

\* \* \* \* \*